United States Patent
Perrin et al.

(10) Patent No.: US 9,055,543 B2
(45) Date of Patent: Jun. 9, 2015

(54) REDUCED POWER WIRELESS WAKE ON CONNECTION

(71) Applicant: Lenovo (Singapore) Pte. Ltd., Singapore (SG)

(72) Inventors: Steven Richard Perrin, Raleigh, NC (US); Matthew Price Roper, Raleigh, NC (US); Howard Locker, Cary, NC (US); Scott Edwards Kelso, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 223 days.

(21) Appl. No.: 13/690,310

(22) Filed: Nov. 30, 2012

(65) Prior Publication Data
US 2014/0154984 A1    Jun. 5, 2014

(51) Int. Cl.
*H04B 7/00*   (2006.01)
*H04W 52/32*  (2009.01)
*H04W 52/02*  (2009.01)

(52) U.S. Cl.
CPC ........ *H04W 52/325* (2013.01); *H04W 52/0229* (2013.01); *H04W 52/0274* (2013.01); *Y02B 60/50* (2013.01)

(58) Field of Classification Search
CPC ..................................................... H04W 76/04
USPC ............................................... 455/41.1, 41.2
See application file for complete search history.

(56) References Cited

U.S. PATENT DOCUMENTS

| 8,134,942 B2* | 3/2012 | Messinger et al. ............ 370/311 |
| 2004/0210675 A1* | 10/2004 | Boles ................................ 710/1 |
| 2014/0227974 A1* | 8/2014 | Perkins et al. ................ 455/41.1 |

* cited by examiner

*Primary Examiner* — Tuan H Nguyen
(74) *Attorney, Agent, or Firm* — Ference & Associates LLC

(57) ABSTRACT

An aspect provides a method, including: receiving, at a low power wireless communication subsystem of an information handling device, a beacon from a wirelessly connectable device; determining, with the low power wireless communication subsystem, if the received beacon warrants executing a communication protocol; in response to determining the received beacon warrants executing a communication protocol, powering on a main system component and a higher power wireless communication subsystem; and establishing a wireless connection between the higher power wireless communication subsystem and the wirelessly connectable device. Other aspects are described and claimed.

18 Claims, 4 Drawing Sheets

REDUCED POWER WIRELESS WAKE ON CONNECTION

BACKGROUND

Information handling devices ("devices"), for example laptop computers and other mobile devices such as tablet computing devices, etc., may be used in connection with another device, for example a docking device ("dock") offering connectivity to other peripheral devices, such as a display screen. Conventionally the information handling devices are docked or otherwise connected to another device by making a physical connection therewith, in response to which a pairing mechanism is triggered such that the information handling device may communicate with the connected device. This affords users with an opportunity to leverage the capabilities of peripheral devices while using their mobile device as a base for content. For example, a laptop may be connected to a peripheral device such as a projector, either directly or via a dock, to afford increased display for presenting application material, e.g., a slide show, operated by the laptop computing device.

Additionally, devices may be connected using wireless network communication means, for example a short range wireless connection such as that afforded by BLUETOOTH technology. Thus, an information handling device such as a laptop computing device, a tablet or smart phone device, or the like, may be paired via short range wireless communication to another device, e.g., wireless speakers or the like, for use in connection therewith. Thus, devices may be connected wirelessly upon discovery of one another, at which point a predetermined pairing protocol may be executed, affording an operative connection between the devices for appropriate communications.

BRIEF SUMMARY

In summary, one aspect provides a method, comprising: receiving, at a low power wireless communication subsystem of an information handling device, a beacon from a wirelessly connectable device; determining, with the low power wireless communication subsystem, if the received beacon warrants executing a communication protocol; in response to determining the received beacon warrants executing a communication protocol, powering on a main system component and a higher power wireless communication subsystem; and establishing a wireless connection between the higher power wireless communication subsystem and the wirelessly connectable device.

Another aspect provides an information handling device, comprising: a low power wireless communication subsystem; a higher power wireless communication subsystem; one or more processors; and a memory operatively coupled to the one or more processors that stores instructions executable by the one or more processors to perform acts comprising: receiving, at the low power wireless communication subsystem of the information handling device, a beacon from a connectable device; determining, with the low power wireless communication subsystem, if the received beacon warrants executing a communication protocol; in response to determining the received beacon warrants executing a communication protocol, powering on a main system component and the higher power wireless communication subsystem; and establishing a wireless connection between the higher power wireless communication subsystem and the connectable device.

A further aspect provides a program product, comprising: a storage medium having computer program code embodied therewith, the computer program code comprising: computer program code configured to receive, at a low power wireless communication subsystem of an information handling device, a beacon from a connectable device; computer program code configured to determine, with the low power wireless communication subsystem, if the received beacon warrants executing a communication protocol; computer program code configured to, in response to determining the received beacon warrants executing a communication protocol, powering on a main system component and a higher power wireless communication subsystem; and computer program code configured to establish a wireless connection between the higher power wireless communication subsystem and the connectable device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
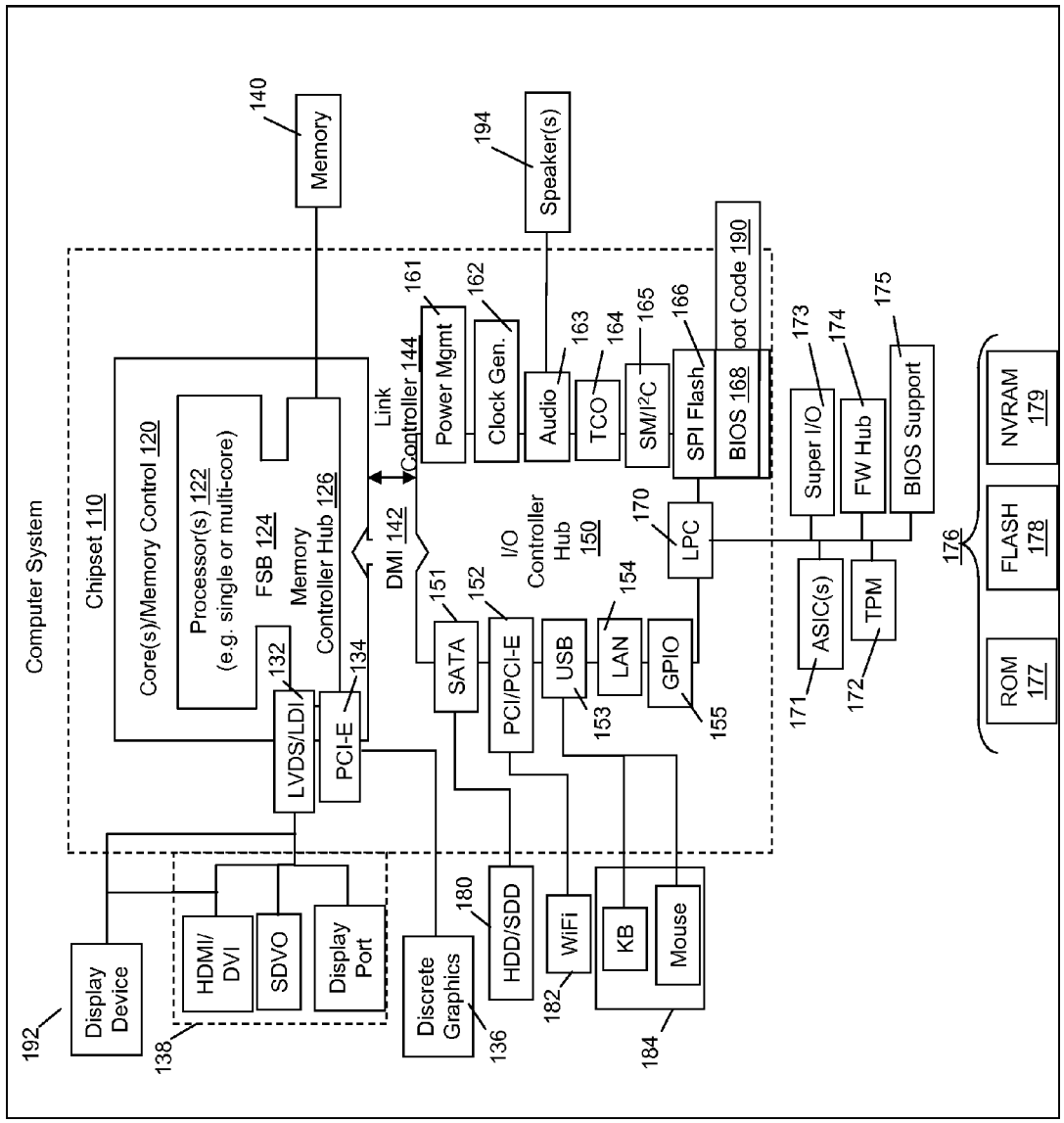
FIG. 1 illustrates an example information handling device and components thereof.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While physically connecting devices, such as a laptop computing device and a docking station, offers a convenient triggering mechanism for pairing the devices, device manufacturers are moving away from this model, as users are desirous of wirelessly connected devices. Thus, the convenience of a physical triggering mechanism is no longer reliably available.

While some devices pair in a wireless fashion, e.g., according to a short range wireless pairing protocol, for example using BLUETOOTH technology, these wireless associations have some drawbacks, particularly from a power management standpoint. For example, in order to successfully pair two devices using a BLUETOOTH pairing protocol, the devices must be fully powered in order to discover one another, e.g., via a beacon send and receive mechanism. This may be problematic from the perspective of mobile devices reliant on internal battery power, such as a laptop computing device, tablet or smart phone devices, and the like. Thus, a constant power drain is required for such an active pairing over wireless network.

Accordingly, an embodiment provides for a low-power subsystem to remain powered on at all times for a device, drawing very little battery power. This low-power subsystem may be dedicated to a discovery and wake function, whereby on discovery of a connectable device, such as a wireless dock, the subsystem may power up the main system via suitable communication (e.g., sending a wake signal to the main system of a laptop or other computing device). Therefore, only in response to discovery of a connectable device does the main system wake and expend resources establishing a connection (e.g., high bandwidth connection) with the connectable device. Using such power saving discovery and wake functionality, an embodiment provides a convenient mechanism which saves battery power while affording an appropriate wireless triggering method.

The illustrated example embodiments will be best understood by reference to the figures. The following description is intended only by way of example, and simply illustrates certain example embodiments.

Figure 2:
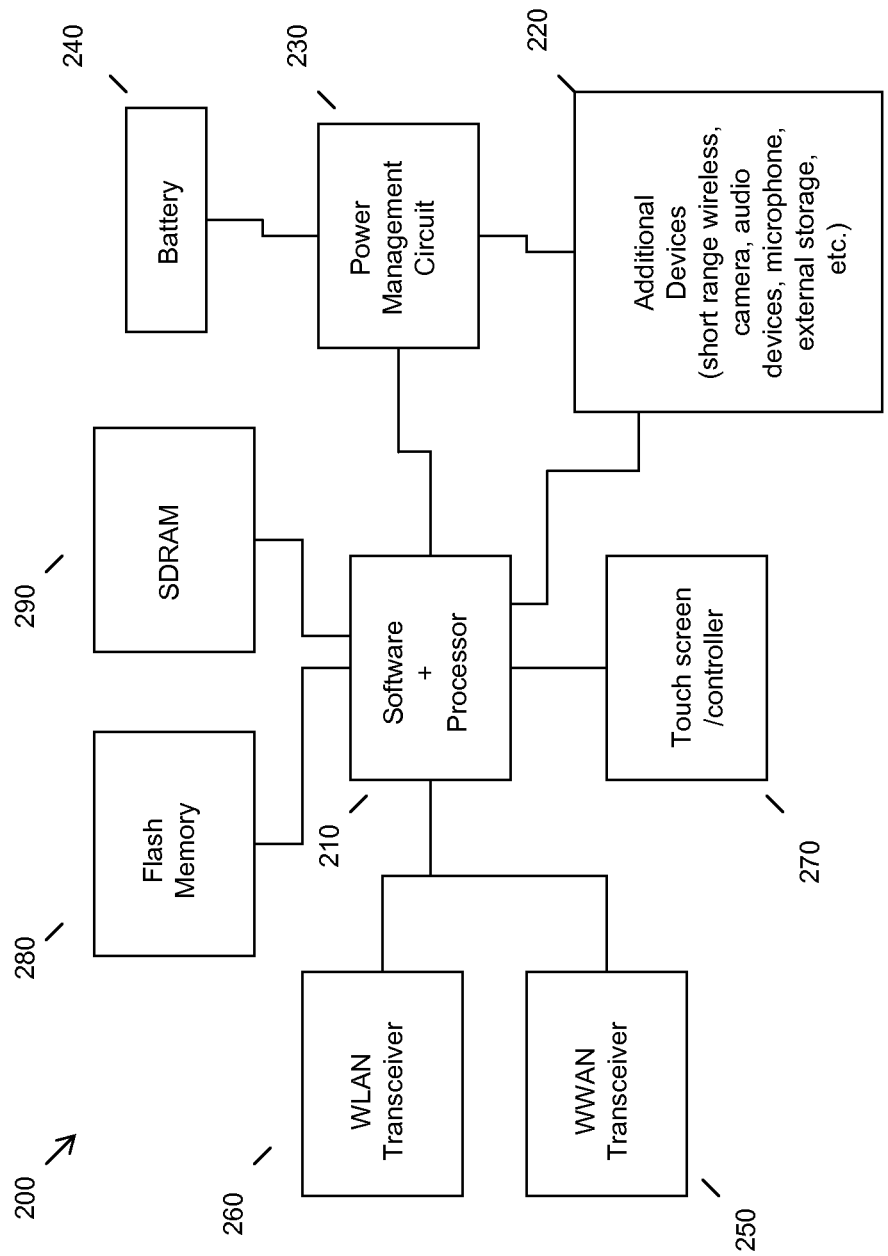
FIG. 2 illustrates another example information handling device and components thereof.

Referring to FIG. 1 and FIG. 2, while various other circuits, circuitry or components may be utilized, with regard to smart phone and/or tablet circuitry 200, an example illustrated in FIG. 2 includes an ARM based system (system on a chip) design, with software and processor(s) combined in a single chip 210. Internal busses and the like depend on different vendors, but essentially all the peripheral devices (220) may attach to a single chip 210. In contrast to the circuitry illustrated in FIG. 1, the tablet circuitry 200 combines the processor, memory control, and I/O controller hub all into a single chip 210. Also, ARM based systems 200 do not typically use SATA or PCI or LPC. Common interfaces for example include SDIO and I2C. There are power management chip(s) 230, which manage power as supplied for example via a rechargeable battery 240, which may be recharged by a connection to a power source (not shown), and in at least one design, a single chip, such as 210, is used to supply BIOS like functionality and DRAM memory.

ARM based systems 200 typically include one or more of a WWAN transceiver 250 and a WLAN transceiver 260 for connecting to various networks, such as telecommunications networks and wireless base stations. Commonly, an ARM based system 200 will include a touch screen 270 for data input and display. ARM based systems 200 also typically include various memory devices, for example flash memory 280 and SDRAM 290.

FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Figure 3:
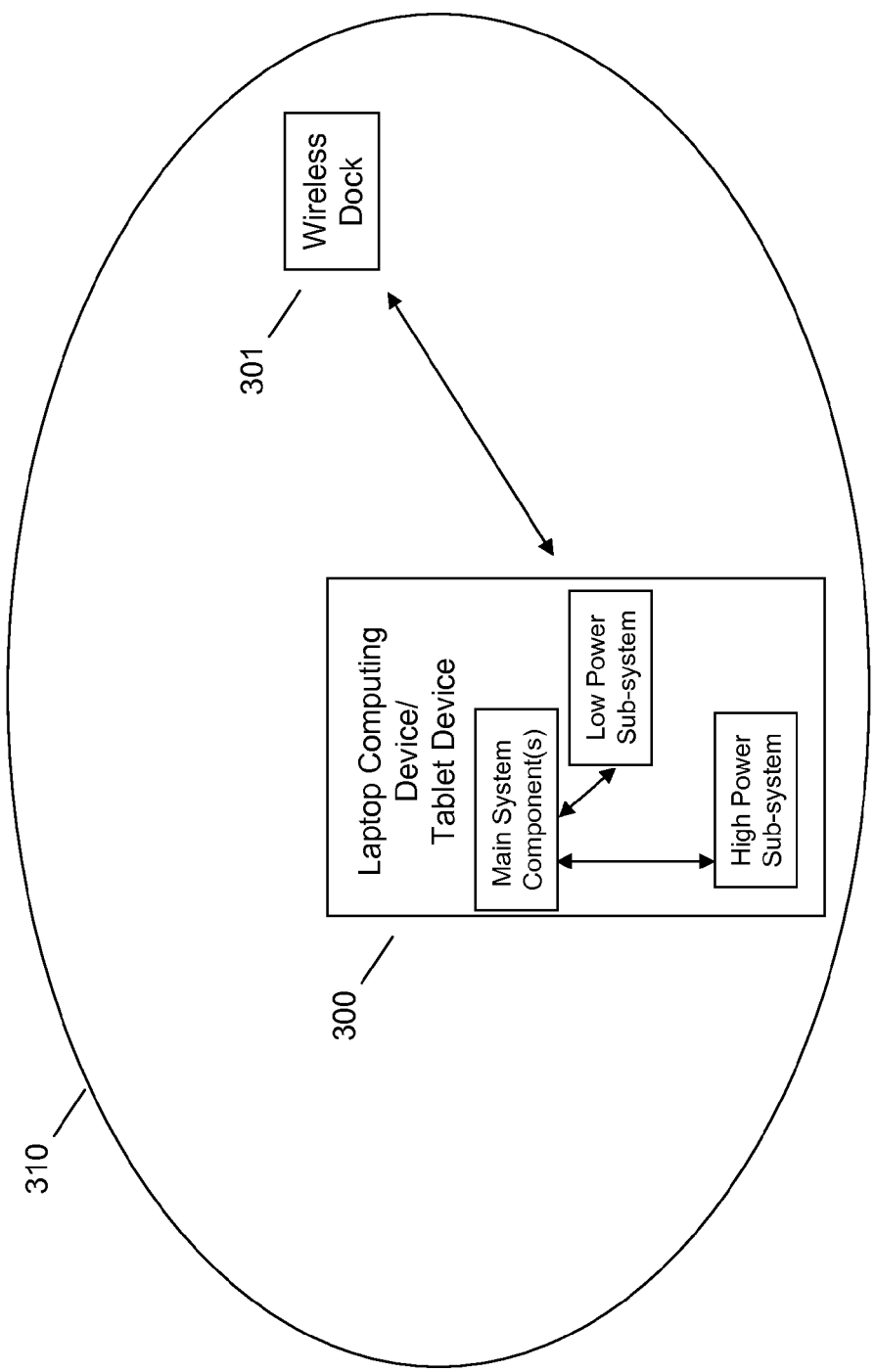
FIG. 3 illustrates an example reduced power wireless wake on connection operating environment.

Devices such as outlined in FIGS. 1 and 2 may be utilized to connect wirelessly to other devices, such as a wireless dock, as illustrated in FIG. 3. A connectable device, such as a wireless dock 301, may send out beacons to discover other devices, such as a laptop computing device and/or a tablet device 300. The beacon may contain information regarding proximity, for example as characterized by the strength of the received beacon (as perceived at the laptop computing device 300). Accordingly, a wireless discovery protocol may permit discovery when two devices are within wireless range of one another, as indicated at 310, or within a predetermined distance from one another, as further described herein.

An embodiment may utilize this protocol (or other like discovery protocol) in a reduced power wireless wake on connection mechanism. While conventionally the laptop computing device 300 (or other like device) is fully powered during a discovery and connect phase, an embodiment facilitates power savings by provisioning a low-powered subsystem, such as implemented by adding a low-power short range wireless communication module to a device such as illustrated in FIG. 1 or FIG. 2. The low power subsystem may be added to the device of FIG. 1 in a similar fashion as WiFi module 182, or may be added to the device of FIG. 2 as an additional device 220. The low power subsystem handles discovery of a connectable device within a predetermined range, for example wireless dock 301.

Figure 4:
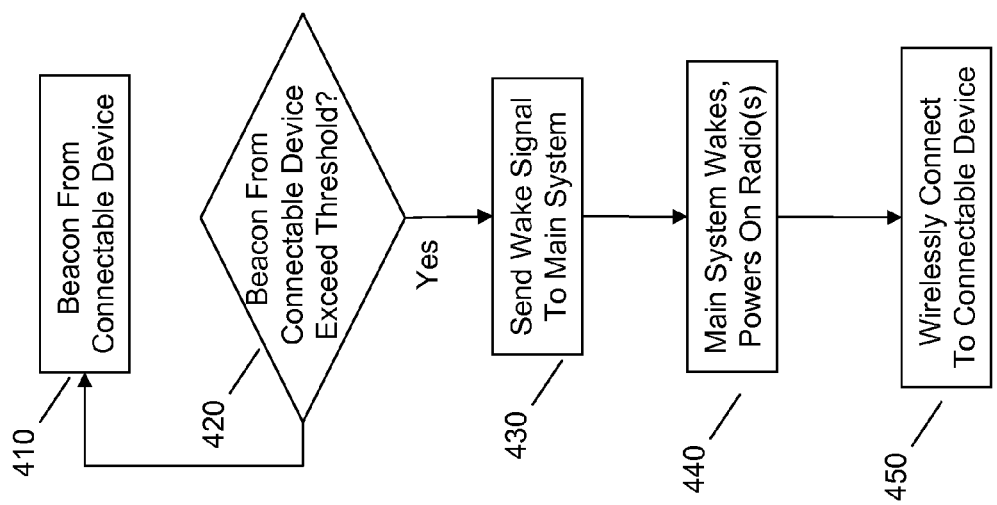
FIG. 4 illustrates an example reduced power wireless wake on connection method.

Accordingly, referring to FIG. 4, if the low power subsystem, which may remain powered even though the main system (including a main processing unit(s), memory, etc.) remains powered off, receives a beacon from a connectable device at 410, it may determine if the beacon is of sufficient quality, as for example comparing it to a threshold. The threshold may be any desirable metric of beacon quality, for example proximity or device identity. Thus, an embodiment employs a low-powered subsystem to determine if the received beacon exceeds a predetermined threshold that warrants a wake and connection event at 420. Note that although "exceeds" (or the like) may imply the beacon characteristic (e.g., proximity correlated with signal strength) must be above a predetermined threshold, this is simply for ease of description. Other like mechanisms are provided, for example a matching mechanism (e.g., in the case of device identification matching a predetermined device identification), or the like. Device identifications may refer to a specific device or to a family of devices. For example, the user might want this procedure to work with any dock from a particular manufacturer "out of the box", without prior configuration. Additionally, a suitable combination of "thresholds" may be employed to ascertain if the beacon warrants a wake and connect event at 420.

In response to determining that a beacon warrants a wake and connection event at 420, at 430 an embodiment produces a wake signal in the low-power subsystem that is sent to a suitable location to wake and power up the main system or one or more components thereof, e.g., resume the laptop computing device from a suspended or other low power state. The main system may thus wake in response to the wake signal of step 430.

At step 440, the main system wakes and powers on a higher-powered communication subsystem, for example a higher bandwidth radio used for communicating with a connectable device in an operable fashion. On powering on of the higher-powered communication subsystem, the main system (e.g., laptop computing device) may then proceed to perform a conventional wireless pairing with the connectable device at 450. Thus, an embodiment provides a low-powered subsystem that preserves power (e.g., by virtue of allowing a main system to remain in a low powered state) unless and until a suitable connectable device is discovered. In at least one embodiment, the suitable connectable device is at the very least within a predetermined distance from the information handling device (e.g., laptop computing system), as ascertained through a beacon characteristic, e.g., a beacon strength metric.

A non-limiting example of a low power wake and connect mechanism between an information handling device 300 and a wireless dock 301 operates as per the following procedure. In an information handling device having WIGIG capability (i.e., a high power, high bandwidth wireless communication subsystem), having such a capability will enable very high speed (up to 7 Gbps) wireless connections over relatively short distances. The technology is ideal for high bandwidth applications like wireless display and wireless USB. WIGIG is able to achieve these speeds by using wide channels in the 60 GHz spectrum. The WIGIG specifications anticipate that the technology will be used for wireless docks and for remote projectors/displays. WIGIG radios, part of the WIGIG subsystem of an information handling device 300, will perform a scan of their surroundings to find another radio that they can communicate with, such as included with a wireless dock 301. However, the WIGIG radios and other subsystem components consume a great deal of power while the scan is in progress. It is not practical to perform this scan all of the time for a batter powered device such as a laptop computing device 300.

Accordingly, in addition to a WIGIG subsystem, and embodiment uses a lower-power subsystem, for example BLUETOOTH LE subsystem, to enable power savings in device discovery and connectivity. When the user approaches a connectable device, such as the dock 301 of FIG. 3 with his or her information handling device, such as laptop computing device 300 of FIG. 3, the device 300 may automatically wake and establish a connection to the dock 301, for example according to the example method outlined in FIG. 4.

Existing docks use physical connections between the system and dock. The dock is effectively plug and play; the act of making the connection is, by itself, sufficient to wake the system and initiate a connection. Some docking solutions use wireless technologies. However, these solutions require that the user leave their system in a fully powered state in order to make a connection. This requirement reduces battery life and is impractical when systems, such as laptop computing device 300 employ high power communications systems.

Thus, an embodiment uses a low energy communication subsystem, e.g., BLUETOOTH LE subsystem, in both the system 300 and the dock 301. Using standard BLUETOOTH procedures, the devices 300, 301 may pair with one another. The BLUETOOTH LE subsystem in the device 300 stores the identification of the dock 301 in a memory. The BLUETOOTH LE subsystem in the dock 301 may remain powered (e.g., at all times by virtue of an outlet power connection).

When the device 300 enters a low power state, e.g., a suspend state, its BLUETOOTH LE subsystem remains powered and active. The device 300 consumes very little power in this state. The device 300 BLUETOOTH LE subsystem scans (e.g., continuously, periodically, etc.) for other BLUETOOTH LE devices (connectable devices) which are within range 310. When device 300 detects the dock 301, the BLUETOOTH LE subsystem wakes the main system of the device 300, and triggers the establishment of a connection between the device 300 and dock 301, e.g., using WIGIG radios. Thus, an embodiment permits high bandwidth communication connections while permitting the device 300 to conserve power, e.g., via powering off certain components (e.g., WIGIG radios/subsystem(s)), powering off the main system, or a suitable combination of the foregoing.

It will also be understood that the various embodiments may be implemented in one or more information handling devices configured appropriately to execute program instructions consistent with the functionality of the embodiments as described herein. In this regard, FIG. 1 and FIG. 2 illustrate non-limiting examples of such devices and components thereof.

As will be appreciated by one skilled in the art, various aspects may be embodied as a system, method or computer program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device/computer readable medium that can direct a device to function in a particular manner, such that the instructions stored in the device readable medium produce an article of manufacture including instructions which implement the function/act specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising: receiving, at a low power wireless communication subsystem of an information handling device, a beacon from a wirelessly connectable device; determining, with the low power wireless communication subsystem, if the received beacon exceeds a predetermined threshold that warrants executing a communication protocol; in response to determining the received beacon warrants executing a communication protocol, powering on a main system component and a higher power wireless communication subsystem; and establishing a wireless connection between the higher power wireless communication subsystem and the wirelessly connectable device.

2. The method of claim 1, further comprising, responsive to determining that the received beacon warrants executing a communication protocol, sending a wake signal from the low power wireless communication subsystem to a main system of the information handling device.

3. The method of claim 2, further comprising, responsive to receiving the wake signal by the main system, shifting the main system to a higher power state.

4. The method of claim 3, wherein shifting the main system to a higher power state comprises resuming the system from a suspended state.

5. The method of claim 1, wherein determining, with the low power wireless communication subsystem, if the received beacon warrants executing a communication protocol further comprises:
inspecting a beacon characteristic.

6. The method of claim 5, wherein inspecting a beacon characteristic comprises comparing a device identification to a stored set of device identifications.

7. The method of claim 1, wherein the low power communication subsystem comprises a short range wireless communication subsystem with a receiver configured to receive the beacon.

8. The method of claim 7, wherein the higher power wireless communication subsystem comprises a short range wireless communication subsystem.

9. The method of claim 8, wherein the higher power wireless communication subsystem is of higher bandwidth than the low power wireless communication subsystem.

10. An information handling device, comprising: a low power wireless communication subsystem; a higher power wireless communication subsystem; one or more processors; and a memory operatively coupled to the one or more processors that stores instructions executable by the one or more processors to perform acts comprising: receiving, at the low power wireless communication subsystem of the information handling device, a beacon from a connectable device; determining, with the low power wireless communication subsystem, if the received beacon exceeds a predetermined threshold that warrants executing a communication protocol; in response to determining the received beacon warrants executing a communication protocol, powering on a main system component and the higher power wireless communication subsystem; and establishing a wireless connection between the higher power wireless communication subsystem and the connectable device.

11. The information handling device of claim 10, wherein the acts further comprise, responsive to determining that the received beacon warrants executing a communication protocol, sending a wake signal from the low power wireless communication subsystem to a main system of the information handling device.

12. The information handling device of claim 11, wherein the acts further comprise, responsive to receiving the wake signal by the main system, shifting the main system to a higher power state.

13. The information handling device of claim 12, wherein shifting the main system to a higher power state comprises resuming the system from a suspended state.

14. The information handling device of claim 10, wherein determining, with the low power wireless communication subsystem, if the received beacon warrants executing a communication protocol further comprises:
inspecting a beacon characteristic.

15. The information handling device of claim 14, wherein inspecting a beacon characteristic comprises comparing a device identification to a stored set of device identifications.

16. The information handling device of claim 10, wherein the low power communication subsystem comprises a short range wireless communication subsystem with a receiver configured to receive the beacon.

17. The information handling device of claim 16, wherein the higher power wireless communication subsystem comprises a short range wireless communication subsystem; and further wherein the higher power wireless communication subsystem is higher bandwidth than the low power wireless communication subsystem.

18. A program product, comprising: a storage medium having computer program code embodied therewith, the computer program code being executable by a processor and comprising: computer program code configured to receive, at a low power wireless communication subsystem of an information handling device, a beacon from a connectable device; computer program code configured to determine, with the low power wireless communication subsystem, if the received beacon warrants executing a communication protocol; computer program code configured to, in response to determining the received beacon exceeds a predetermined threshold that warrants executing a communication protocol, powering on a main system component and a higher power wireless communication subsystem; and computer program code configured to establish a wireless connection between the higher power wireless communication subsystem and the connectable device.

* * * * *